United States Patent [19]
Yoshihara et al.

[11] Patent Number: 5,598,339
[45] Date of Patent: Jan. 28, 1997

[54] NAVIGATION APPARATUS FOR VEHICLES

[75] Inventors: Tohru Yoshihara; Shigeru Tsujimura; Shinichi Takemura; Masashi Shimakata; Masaya Adachi; Hayato Yoshida; Hitoshi Ando; Tsutomu Honda, all of Saitama, Japan

[73] Assignee: Pioneer Electronic Corporation, Tokyo, Japan

[21] Appl. No.: 352,816

[22] Filed: Dec. 1, 1994

Related U.S. Application Data

[63] Continuation of Ser. No. 662,592, Mar. 1, 1991, abandoned.

[30] Foreign Application Priority Data

Mar. 6, 1990 [JP] Japan ................................. 2-52831
Mar. 15, 1990 [JP] Japan ................................. 2-62630

[51] Int. Cl.[6] .................................................. G06F 165/00
[52] U.S. Cl. ...................... 364/449.7; 340/990; 340/995
[58] Field of Search ................................. 364/443, 444, 364/449; 73/178 R; 340/988, 990, 995

[56] References Cited

U.S. PATENT DOCUMENTS 4,731,613  3/1988  Endo et al. ........................ 342/357
4,897,792  1/1990  Hosoi ................................. 364/449
4,903,212  2/1990  Yokouchi et al. ................. 364/449
4,912,645  3/1990  Kakihara et al. ................. 364/449
4,928,107  5/1990  Kuroda et al. .................... 364/449
4,937,752  6/1990  Nanba et al. ..................... 364/449
4,949,268  8/1990  Nishikawa et al. ............... 364/449

FOREIGN PATENT DOCUMENTS 61-90069    5/1986  Japan.
63-238479  10/1988  Japan.
63-238480  10/1988  Japan.

Primary Examiner—Gary Chin
Attorney, Agent, or Firm—Sughrue, Mion, Zinn, Macpeak & Seas

[57] ABSTRACT

A navigation apparatus for a vehicle using a GPS (Global Positioning System) as sensing means in which information on the basis of sensed results, such as a present position, a running locus and the like are displayed in a predetermined form of display on a display section is disclosed. In cases where the GPS receiver cannot receive radio waves from artificial satellites, and sensing thus becomes disabled, a sensed final present position is displayed with an altered form of display.

22 Claims, 5 Drawing Sheets

NAVIGATION APPARATUS FOR VEHICLES

This is a continuation of application No. 07/662,592 filed Mar. 1, 1991 now abandoned.

BACKGROUND OF THE INVENTION

This invention relates to a navigation apparatus for a vehicle which uses a GPS (Global Positioning System) receiver as a sensing means to display on a display section information on the basis of sensed results such as a present position, a running locus and the like.

In the conventional navigation apparatus for a vehicle of this kind, information such as a present position, a running locus and the like on the basis of sensed results by the GPS receiver are displayed by a predetermined marker and a predetermined bright line on a map displayed on an image plane of a display section.

When a vehicle passes through a ravine, between buildings, through a tunnel or the like which cannot receive radio waves from the artificial satellite, the GPS receiver cannot effect sensing.

In such a case, a final position sensed continues to be displayed on the display section in the same form.

In the conventional navigation apparatus for a vehicle, in the case where the GPS receiver can no longer effect sensing because the former cannot receive radio waves from the artificial satellite, the final present position displayed on the display section continues to be displayed. This poses an inconvenience in that a user may not notice that the present position marker on the display section has stopped. Thus, the user sometimes fails to recognize an actual running position and an adequate (sufficient) running guide cannot always be given to the user.

Particularly, the navigation apparatus for a vehicle of this kind uses a display section having a relatively small display image plane. Therefore, in the case where the vehicle runs at a normal speed, although the display point indicating a present position on the display section moves, movement of the display point cannot be recognized immediately. Thus, the user may not become aware of a discrepancy between the actual running position and the present position displayed on the display section until after much time has passed.

This invention has as objects overcoming the aforementioned inconveniences and providing a navigation apparatus for a vehicle which can immediately confirm on the basis of a variation of a display state of a present position on the display section that movement of the present position has stopped, and which can prevent an actual running present position from being mistaken.

Furthermore, in the conventional navigation apparatus, it is contemplated that the GPS receiver becomes incapable of performing sensing either when the number of artificial satellites capable of receiving radio waves is small, or when the vehicle passes through a ravine, between buildings, through a tunnel or the like, and therefore becomes incapable of receiving radio waves from the artificial satellite even though the number of artificial satellites capable of receiving radio waves is sufficient.

In such a case, displaying of information such as a present position, a running locus and the like is discontinued and, instead, information such as a final present position sensed on the image plane of the display section or the running locus to the final present position continues to be displayed on the display section.

In the conventional navigation apparatus for a vehicle, when the GPS receiver becomes incapable of performing sensing, the final present position displayed on the image plane of the display section does not move but remains stationary, and the running locus remains unchanged.

Judgment is not made that such a state results from the small number of artificial satellites capable of receiving radio waves or results from the radio waves from the artificial satellites being cut off despite there being a sufficient number of artificial satellites. This poses inconveniences in that the final present position or the running locus to the final present position continues to be displayed, which causes the user (a driver) to mistake a running position. Alternatively, it poses the problem that a user may mistakenly believe that the number of artificial satellites capable of receiving radio waves is insufficient, even though the cause is merely a transient cut off of radio waves. As a result, the user would turn off the power source of the navigation apparatus for a vehicle, even though the lack of reception is merely transient.

Another object of the invention is to overcome the aforementioned inconveniences and further to provide a navigation apparatus for a vehicle which can precisely inform the user of the fact that sensing is impossible due to a shortage in the number of artificial satellites capable of receiving radio waves, or that sensing is impossible because, even though the number of artificial satellites capable of receiving radio waves is sufficient, radio waves from the artificial satellites are temporarily cut off.

SUMMARY OF THE INVENTION

In a navigation apparatus for a vehicle according to a first aspect of this invention, in the case where a GPS receiver becomes incapable of effecting sensing because the receiver cannot receive radio waves from an artificial satellite, the sensed final present position is displayed in a changed form of display. In a navigation apparatus for a vehicle according to a second aspect of the invention, the changed form of display comprises a flickering display.

In a navigation apparatus for a vehicle according to a third aspect of the invention, the changed form of display is maintained until sensing by the GPS receiver becomes enabled again.

In a navigation apparatus for a vehicle according to a fourth aspect of the invention, displaying of a present position is resumed from a point at which sensing by the GPS receiver becomes enabled again.

Accordingly, it is possible to immediately confirm on the basis of the change in display state that movement of the present position has stopped, and to prevent an actual running present position from being mistaken.

In a navigation apparatus for a vehicle according to another aspect of the invention, in the case where sensing by the GPS receiver becomes disabled due to a shortage in the number of artificial satellites capable of receiving radio waves, the time is displayed on the display section at which sensing will become enabled again. This time, determined on the basis of almanac data from the artificial satellites, is displayed on the display section either as the time when sensing will be re-enabled or as a waiting time that will elapse until re-enablement.

In a navigation apparatus for a vehicle according to still another aspect of the invention, in the case where sensing by the GPS receiver becomes disabled due to the fact that, while the number of artificial satellites capable of receiving radio waves is sufficient, radio waves from the artificial satellites are cut off, final position information is displayed in altered form on the display section.

Accordingly, the user can look at the time on the display section or at the time elapsed or at the final information with the form of display changed to thereby precisely grasp whether sensing has become disabled due to a shortage in the number of artificial satellites capable of receiving radio waves or because the radio waves from the artificial satellites have been cut off.

DETAILED DESCRIPTION OF THE PREFERRED EMBODIMENTS

Figure 1:
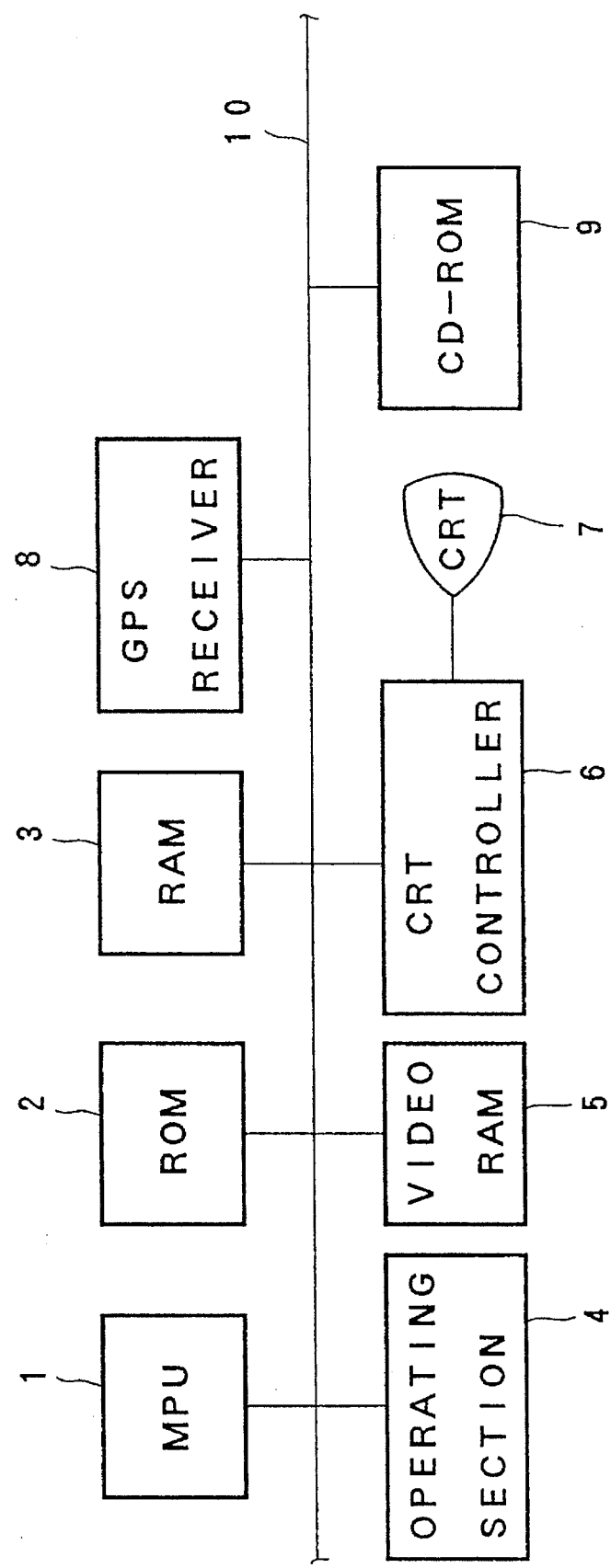
FIG. 1 is a block diagram showing the structure of a navigation apparatus for a vehicle according to one embodiment of this invention.

FIG. 1 is a block diagram showing the structure of a navigation apparatus for a vehicle according to one embodiment of this invention. Reference numeral 1 denotes an MPU, in which a system program stored in a ROM 2 is executed to thereby realize various necessary functions with a RAM 3 used as a work area.

A navigation apparatus for a vehicle is controlled by a microcomputer composed of the MPU 1, the ROM 2 and the RAM 3.

Reference numeral 4 designates an operating section provided with ten keys for applying necessary inputs, function keys, a touch panel and the like. Reference numeral 5 designates a video RAM for storing image data for one image plane portion displayed on the image plane of a CRT 7. The image data stored by the video RAM 5 is delivered to a CRT controller 6 by the action of the MPU 1, and a map is displayed on the image plane of CRT 7 connected to the CRT controller 6.

Reference numeral 8 designates a GPS (Global Positioning System) receiver, which, as is known, receives radio waves from a plurality of artificial satellites to effect sensing. It is necessary for sensing a present position to receive radio waves from at least three or more artificial satellites.

Data relating to the present position sensed by the GPS receiver 8 is stored and retained in time series fashion, and the running locus information can be displayed on the map displayed on the image plane of CRT 7 on the basis of the thus stored and retained data.

Reference numeral 9 designates a CD-ROM in which map data displayed on the image plane of CRT 7 is stored. The map data, suitably edited by the action of the MPU 1, is delivered to the video RAM 5.

Reference numeral 10 designates a system bus. The MPU 1, the ROM 2, the RAM 3, the operating section 4, the video RAM 5, the CRT controller 6, the GPS receiver 8, and the CD-ROM 9 are each connected to the system bus 10.

Figure 2:
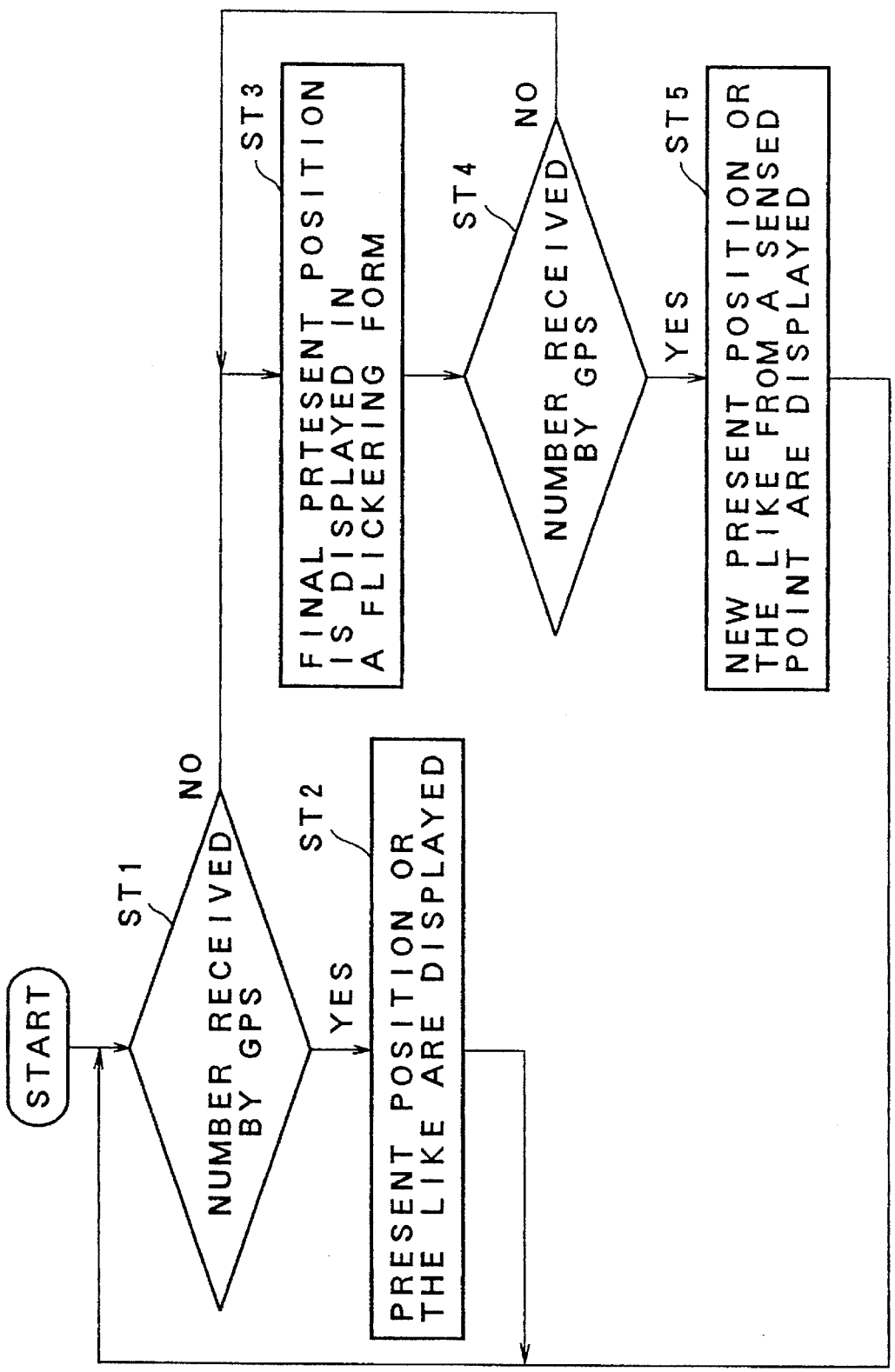
FIG. 2 is a flow chart for explaining the operation of a first embodiment.

FIG. 2 is a flow chart for explaining the operation of a first embodiment of the invention. ST1 to ST5 represent the respective steps.

Figure 3:
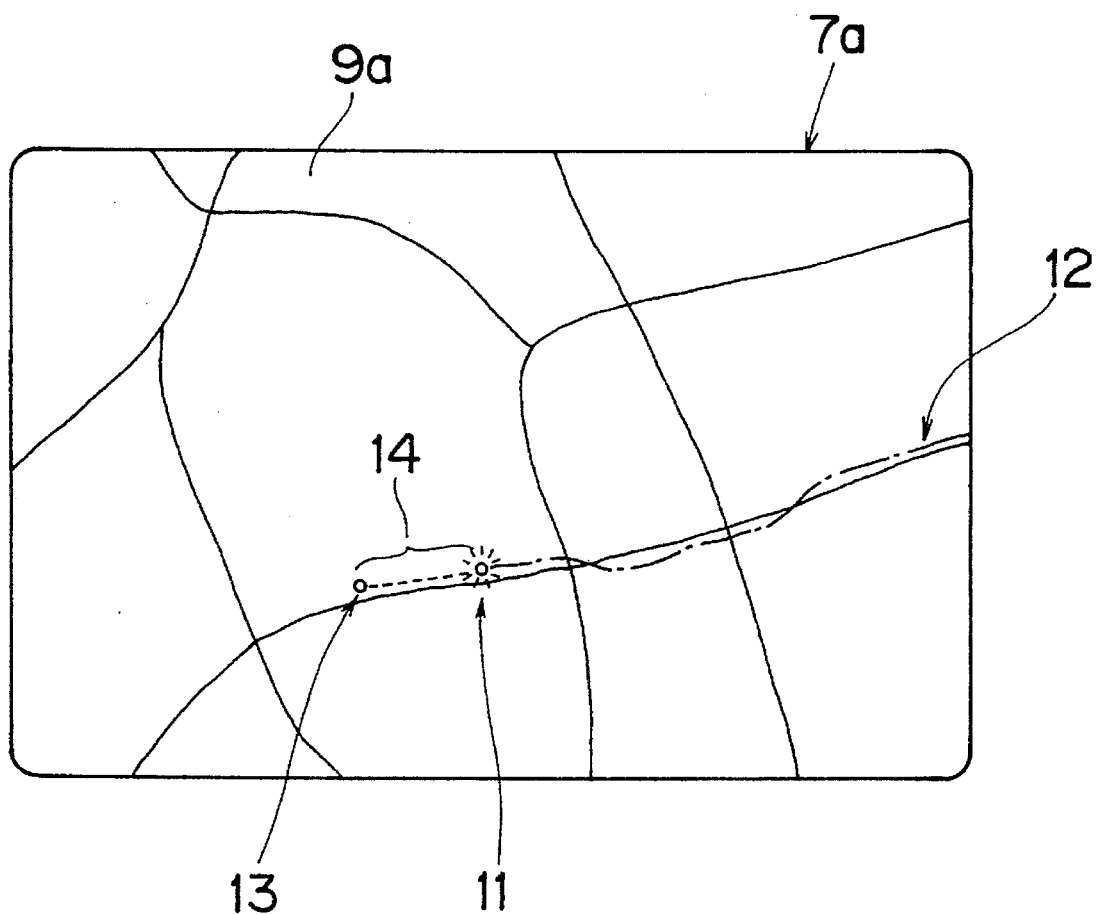
FIG. 3 is an explanatory view showing one example in which the form of display is changed according to the first embodiment.

FIG. 3 is an explanatory view showing one example in which the form of display is changed. Reference numeral 7a designates a display image plane of the CRT 7; 9a designates a map displayed on the image plane 7a; 11 designates a sensed final present position shown at a flickering point; 12 designates a running locus based on the sensed present position; 13 designates a new present position at a point again capable of being measured, shown at a bright point which is continuously lit; and 14 designates a sense-disable section in which sensing was disabled.

Next the operation of the embodiment will be described.

First, processing for displaying the present position and the running locus on the map 9a is started in the state where the map 9a is displayed on the image plane 7a of the CRT 7. Determination is made if the number of artificial satellites capable of receiving radio waves is more than three (Step ST1). If the number of artificial satellites is more than three, the present position is displayed as a continuously lit bright point, indicated in FIG. 3 as a new present position 13. The present position data is also displayed as a running locus 12 on the basis of the stored and retained data, as shown in FIG. 3 (Step ST2).

If the number of artificial satellites capable of receiving radio waves is less than three in the determination of Step ST1, the sensed final present position 11 is displayed as a flickering point, as shown in FIG. 3, indicating, e.g., that the vehicle is passing through a ravine, between buildings or through a tunnel (Step ST3). Thereafter, a determination is made if the number of artificial satellites is more than three (Step ST4).

If the number of artificial satellites capable of receiving radio waves is less than three in the determination of Step ST4, the processing advances to Step ST3. If the number of artificial satellites capable of receiving radio waves is three or more, sensing again becomes possible, and therefore a point at which sensing is resumed is displayed as a new present position 13 as shown in FIG. 3., and a running locus is displayed as a running locus 12 on the basis of stored and retained present position data (Step ST5).

After either Step ST2 or Step ST5 is executed, operation advances to Step ST1.

As shown in FIG. 3, a sense-disable section 14, extending from the final present position 11 to the new present position 13 is displayed in a form different from that of the running locus 12.

Thus, according to the first embodiment, in the case where sensing by the GPS receiver 8 becomes disabled, the final present position 11 sensed is displayed in a form changed from a continuously lit state to a flickering state. Therefore, the user can immediately confirm on the basis of the change in the display state that movement of the present position indicator has stopped and is alerted that the indicator should not be mistaken for the actually running present position of the vehicle.

While in the above-described embodiment an example has been described in which the form of display is changed from a continuously lit state to a flickering state, it is to be noted that, instead or in addition, display color or brightness may be changed.

Furthermore, while a description has been made of an example in which the sense-disable section 14 is displayed in a display form different from that of the running locus 12, it is to be noted that no display may be made.

Figure 4:
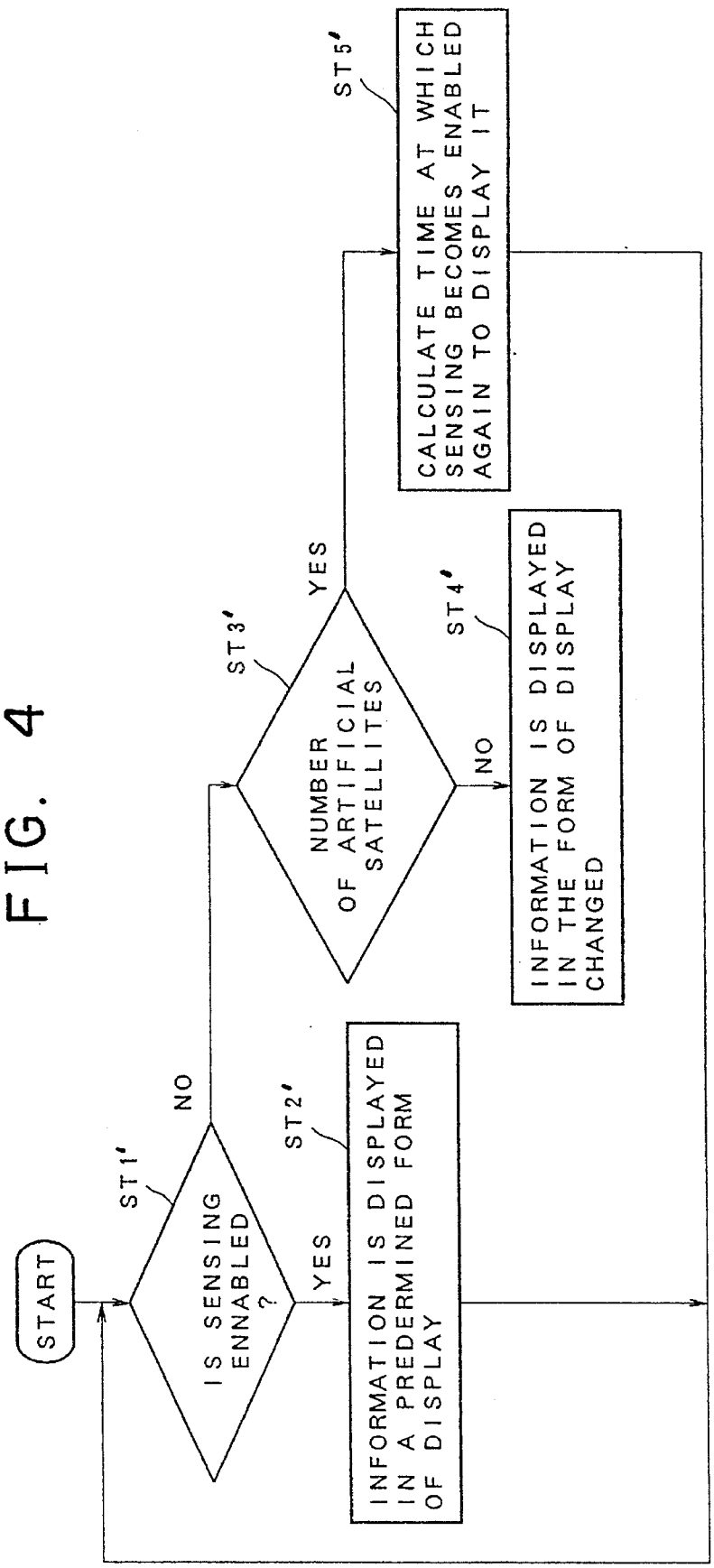
FIG. 4 is a flow chart for explaining the operation of a second embodiment.

FIG. 4 is a flow chart for explaining the operation of a second embodiment. Steps ST1 to ST5 represent respective steps.

Figure 5:
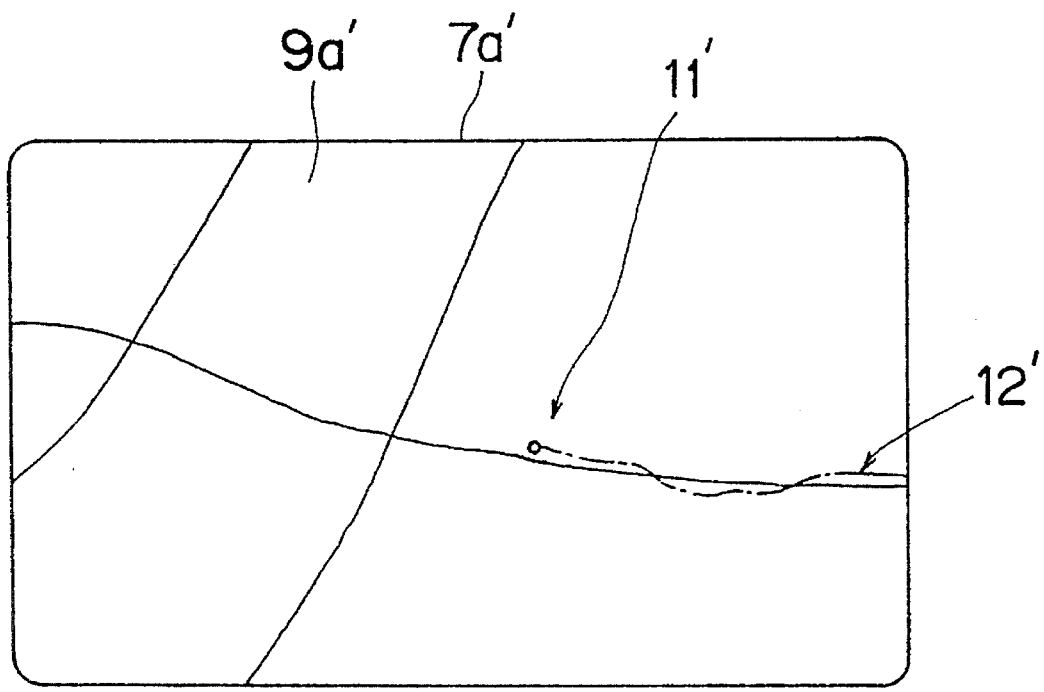
FIGS. 5 and 6 are explanatory views showing examples of the form of display according to the second embodiment.
Figure 6:
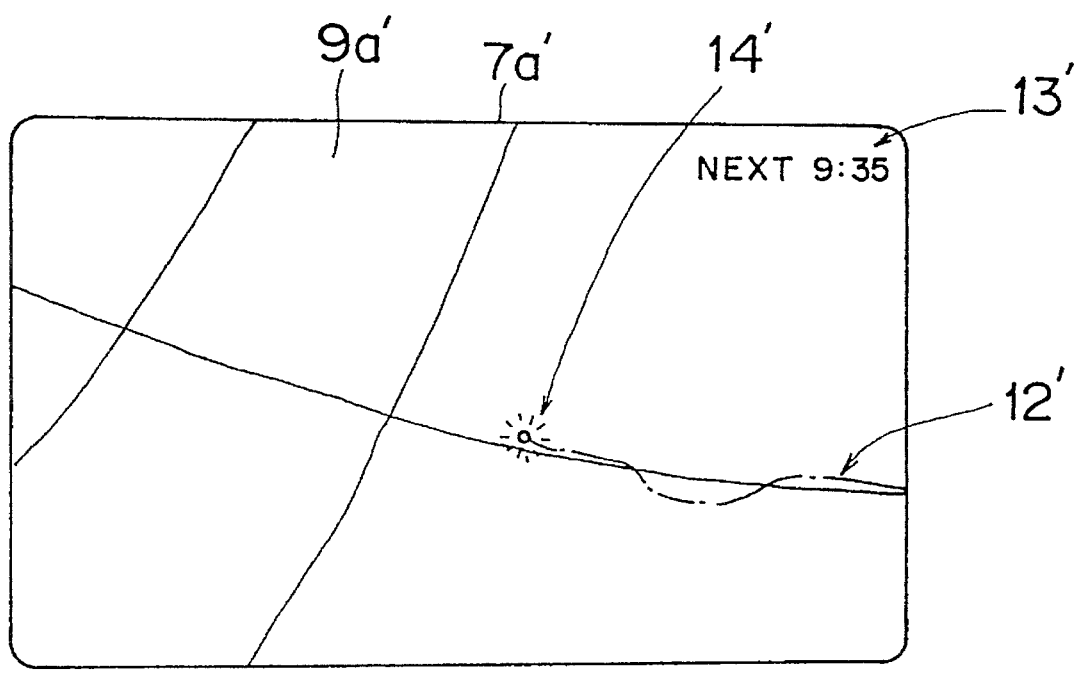

FIGS. 5 and 6 are explanatory views showing one example of the form of display. Reference numeral 7a ' designates a display image plane of a CRT 7, and 9a ' designates a map displayed on the image plane 7a '.

Reference numeral 11' designates a present sensed position displayed as a continuously lit bright point; 12' designates a running locus based on sensed past and present positions 11'; 13' designates a sense-resume time at which sensing becomes enabled again; and 14' designates a sensed final present position displayed as a flickering point.

Next, the operation of the second embodiment will be described.

First, processing is carried out for displaying the present position and the running locus on the map 9a ' formed on the image plane 7a ' of the CRT 7. Determination is made if sensing is enabled (Step ST 1'). If sensing is enabled, the present position 11' and the running locus 12' are displayed in the form shown in FIG. 5 (Step ST2' ).

If sensing is disabled in the determination of Step ST 1', determination is made if the number of artificial satellites capable of receiving radio waves is less than three (Step ST 3'). If the number of artificial satellites capable of receiving radio waves is less than three, sensing is disabled due to the insufficient number of artificial satellites. As a result, the time (sense-resume time 13') at which sensing becomes enabled again is calculated on the basis of almanac data from the artificial satellites. In the present embodiment, the sense-resume time 13' is displayed at the right upper corner of the image plane 7a ' (Step ST 4'), as shown in FIG. 6.

In some cases, even if the number of artificial satellites capable of receiving radio waves is three or more in the determination of Step ST 3', radio waves from the artificial satellites may be cut off to thereby render sensing impossible. In such cases, the final present position 14' is displayed as shown in FIG. 6 (Step ST 5').

After any of the Steps ST 2', ST 4' and ST 5' is carried out, the operation advances to Step ST 1'.

Thus, according to the second embodiment, in the case where the sensing by the GPS receiver 8 becomes disabled, this information is conveyed by displaying the sense-resume time 13' or the final present position 14' on the image plane 7a ' of the CRT 7. This is done whether the sensing is disabled due to a shortage in the number of artificial satellites capable of receiving radio waves or due to radio waves from the artificial satellites being temporarily cut off. Therefore, the user can look at the sense-resume time 13' or the final present position 14' on the image plane 7a ' to thereby precisely grasp the cause of disablement of sensing.

While in the above-described embodiment an example has been described in which the sense-resume time 13' at which sensing becomes enabled again is displayed, it is to be noted that, alternatively, a waiting time displaying the amount of time that will elapse until sensing becomes enabled again may be used.

Furthermore, while in the foregoing an example has been described in which the form of display of the final measured present position 14' is changed, it is to be noted that, either instead or in addition, the form of display of the running locus 12 may be changed.

Moreover, while in the foregoing an example has been described in which the form of display of the final position information is changed to the flickering state, it is to be noted that, instead or in addition, display color or brightness may be changed.

As described above, according to this invention, in the case where sensing becomes disabled because the GPS receiver cannot receive radio waves from the artificial satellites, the sensed final present position is displayed in a display form using flickering until sensing becomes enabled again and the display of the present position is resumed from the present position at which sensing becomes enabled again. Therefore, when sensing becomes enabled again after the sensing has been disabled, the form of display is returned to the original form of display and the display of the present position is resumed from the point at which sensing becomes enabled again.

Accordingly, the user can immediately confirm on the basis of the change in the display state that movement of the present position indicator has stopped. Therefore, the actually running present position can be prevented from being mistaken with the position indicated.

Moreover, according to the present invention, in the case where the sensing by the GPS receiver becomes disabled, this information is conveyed by displaying the time at which sensing becomes enabled again or by displaying the waiting time together with the final position information. The disabling may be either due to a shortage in the number of artificial satellites capable of receiving radio waves or due to radio waves from the artificial satellites being temporarily cut off. Therefore, the user can look at the display section to precisely grasp the cause of disablement of the sensing.

What is claimed is:

1. A vehicle navigation system, comprising:

a global positioning system receiver for receiving position signals;

means for determining if the position signals received are sufficient for converting the position signals into display information;

means for converting the position signals into the display information;

means for displaying the display information in a first form whenever said determining means determines that the position signals received are sufficient for converting the position signals into the display information;

means for changing the display information into an altered form whenever said determining means determines that the position signals received are not sufficient for converting the position signals into the display information;

means for receiving almanac data from a plurality of satellites; and means for calculating, based on the almanac data, a time at which said global positioning system receiver will again be within receiving range of a sufficient number of the satellites for the position signals to be converted into the display information.

2. A vehicle navigation system according to claim 1, wherein said means for changing comprises means for causing-the display information to flicker.

3. A vehicle navigation system according to claim 1, wherein said means for changing comprises means for changing the altered display information back into the first form when said determining means determines that the position signals received are again sufficient for converting the position signals into the display information.

4. A vehicle navigation system, comprising:

a global positioning system receiver for receiving position signals;

means for determining if the position signals received are sufficient for converting the position signals into display information;

means for converting the position signals into the display information;

means for displaying the display information in a first form whenever said determining means determines that the position signals received are sufficient for converting the position signals into the display information;

means for changing the display information into an altered form whenever said determining means determines that the position signals received are not sufficient for converting the position signals into the display information;

means for receiving almanac data from a plurality of satellites; and means for calculating, based on the almanac data, a waiting period during which said global positioning system receiver will be outside of receiving range of a sufficient number of the satellites for the position signals to be converted into the display information.

5. A vehicle navigation system according to claim 4, wherein said means for changing comprises means for causing the display information to flicker.

6. A vehicle navigation system according to claim 4, wherein said means for changing comprises means for changing the altered display information back into the first form when said determining means determines that the position signals received are again sufficient for converting the position signals into the display information.

7. A method for displaying vehicle navigation information, comprising the steps of:

providing position signals to a global positioning system receiver;

obtaining navigation information from the global positioning system receiver;

converting the navigation information into display information;

displaying the display information in a first form on a display means whenever the global positioning system receives the position signals, wherein the display information comprises present position information;

changing the present position information into an altered form whenever the global positioning system fails to receive sufficient position signals for the navigation information to be converted into the display information;

wherein the position signals are provided by a plurality of satellites, and wherein said method further comprises the steps of:

providing almanac data to the global positioning system receiver;

calculating, based on the almanac data, a time at which the global positioning system receiver will again be within receiving range of a sufficient number of the satellites for the navigation information to be converted into the display information; and displaying the calculated time on the display means.

8. A method for displaying vehicle navigation information according to claim 7, wherein said changing step comprises causing the displayed position information to flicker.

9. A method for displaying vehicle navigation information according to claim 7, further comprising the step of continuing to display the altered position information until the global positioning system receiver again receives sufficient position signals for the navigation information to be converted into the display information.

10. A method for displaying vehicle navigation information according to claim 8, further comprising the step of continuing to display the altered position information until the global positioning system receiver again receives sufficient position signals for the navigation information to be converted into the display information.

11. A method for displaying vehicle navigation information according to claim 7, further comprising the step of changing the altered position information back into the first form when the global positioning system receiver again receives sufficient position signals for the navigation information to be converted into the display information.

12. A method for displaying vehicle navigation information according to claim 8, further comprising the step of changing the altered position information back into the first form when the global positioning system receiver again receives the position signals.

13. A method for displaying vehicle navigation information according to claim 7, further comprising the step of changing the present position information into the altered form whenever the global positioning system receiver is within receiving range of a sufficient number of the satellites for the navigation information to be converted into the display information but insufficient position signals are received for the navigation information to be converted into the display information.

14. A method for displaying vehicle navigation information according to claim 7, wherein the display information comprises present position information and running locus information.

15. A method for displaying vehicle navigation information comprising the steps of:

providing position signals to a global positioning system receiver;

obtaining navigation information from the global positioning system receiver;

converting the navigation information into display information;

displaying the display information in a first form on a display means whenever the global positioning system receives the position signals, wherein the display information comprises present position information; and changing the present position information into an altered form whenever the global positioning system fails to receive sufficient position signals for the navigation information to be converted into the display information wherein the position signals are provided by a plurality of satellites, and wherein said method further comprises the steps of:

providing almanac data to the global positioning system receiver;

calculating, based on the almanac data, a waiting period during which the global positioning system receiver will be outside of receiving range of a sufficient number of the satellites in order for the navigation information to be converted into the display information; and displaying the calculated waiting period on the display means.

16. A method for displaying vehicle navigation information according to claim 15, further comprising the step of changing the present position information into the altered form whenever the global positioning system receiver is within receiving range of a sufficient number of the satellites for the navigation information to be converted into the display information but insufficient position signals are received for the navigation information to be converted into the display information.

17. A method for displaying vehicle navigation information according to claim 15, wherein said changing step comprises causing the displayed position information to flicker.

18. A method for displaying vehicle navigation information according to claim 15, further comprising the step of continuing to display the altered position information until the global positioning system receiver again receives sufficient position signals for the navigation information to be converted into the display information.

19. A method for displaying vehicle navigation information according to claim 17, further comprising the step of continuing to display the altered position information until the global positioning system receiver again receives sufficient position signals for the navigation information to be converted into the display information.

20. A method for displaying vehicle navigation information according to claim 15, further comprising the step of changing the altered position information back into the first form when the global positioning system receiver again receives sufficient position signals for the navigation information to be converted into the display information.

21. A method for displaying vehicle navigation information according to claim 17, further comprising the step of changing the altered position information back into the first form when the global positioning system receiver again receives the position signals.

22. A method for displaying vehicle navigation information according to claim 15, wherein the display information comprises present position information and running locus information.

* * * * *